United States Patent
Morsman

(10) Patent No.: US 10,200,238 B2
(45) Date of Patent: Feb. 5, 2019

(54) DYNAMIC LINE MANAGEMENT

(71) Applicant: BRITISH TELECOMMUNICATIONS PUBLIC LIMITED COMPANY, London (GB)

(72) Inventor: Trevor A Morsman, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/125,704

(22) PCT Filed: Mar. 16, 2015

(86) PCT No.: PCT/GB2015/050756
§ 371 (c)(1),
(2) Date: Sep. 13, 2016

(87) PCT Pub. No.: WO2015/145109
PCT Pub. Date: Oct. 1, 2015

(65) Prior Publication Data
US 2017/0005859 A1    Jan. 5, 2017

(30) Foreign Application Priority Data

Mar. 24, 2014   (EP) .................................... 14250051

(51) Int. Cl.
*G06F 15/173* (2006.01)
*H04L 12/24* (2006.01)
(Continued)

(52) U.S. Cl.
CPC .......... *H04L 41/08* (2013.01); *H04L 12/2801* (2013.01); *H04L 12/2878* (2013.01);
(Continued)

(58) Field of Classification Search
USPC .......... 709/218, 223, 224, 226, 229
See application file for complete search history.

(56) References Cited

U.S. PATENT DOCUMENTS

| 7,739,386 B2 * | 6/2010 | Adamczyk | H04L 47/762 709/226 |
| 8,406,135 B2 * | 3/2013 | Pickering | H04L 12/2856 370/232 |

(Continued)

FOREIGN PATENT DOCUMENTS

| CN | 101981875 A | 2/2011 |
| EP | 2 073 446 | 6/2009 |

(Continued)

OTHER PUBLICATIONS

International Search Report for PCT/GB2015/050756 dated May 13, 2015, 3 pages.
(Continued)

*Primary Examiner* — Liang Che A Wang
(74) *Attorney, Agent, or Firm* — Nixon & Vanderhye P.C.

(57) ABSTRACT

This invention relates to a method of dynamic line management (DLM) for a digital subscriber line. A quality of experience (QoE) measure is calculated for the digital subscriber line, and the QoE is recorded with the respective DLM line profile and also the line synchronization rate associated with the line profile. The QoE measure is preferably based on line parameters such as a count of the error rate on the line and loss of synchronizations on the line, averaged over a predetermined period of time. Other line parameters could be used in determining the QoE measure. When DLM exhausts all the available line profiles, the invention checks to see if the QoE associated with the line profile currently being applied is an improvement on the QoE of previously applied line profiles, and if it is an improvement, then the current line profile is maintained. However, if the new QoE is not an improvement to that associated with a previously applied line profile, then the invention reverts the line back to one of the earlier line profiles. The line profile selected to revert back to is one having the same QoE or better, and if there are multiple line profiles satisfying that condition, then the line profile that has the highest associated line synchronization rate is selected.

9 Claims, 3 Drawing Sheets

(51) Int. Cl.
*H04L 12/28* (2006.01)
*H04M 3/30* (2006.01)
*H04L 12/26* (2006.01)

(52) U.S. Cl.
CPC .......... *H04L 41/5067* (2013.01); *H04L 43/16* (2013.01); *H04M 3/306* (2013.01)

(56) References Cited

U.S. PATENT DOCUMENTS

| | | | |
|---|---|---|---|
| 2001/0048667 A1* | 12/2001 | Hamdi | H04L 1/0001 370/252 |
| 2004/0120390 A1 | 6/2004 | Brown et al. | |
| 2005/0163286 A1 | 7/2005 | Jiang et al. | |
| 2005/0175117 A1 | 8/2005 | Wu et al. | |
| 2006/0221849 A1 | 10/2006 | Wu et al. | |
| 2008/0219290 A1 | 9/2008 | Cioffi et al. | |
| 2011/0019575 A1 | 1/2011 | Croot et al. | |
| 2011/0051906 A1 | 3/2011 | Cioffi et al. | |
| 2016/0352499 A1* | 12/2016 | Gedge | H04L 1/0002 |

FOREIGN PATENT DOCUMENTS

| | | | | |
|---|---|---|---|---|
| EP | 2237462 A1 * | 10/2010 | .......... | H04L 1/0001 |
| EP | 2 309 655 | 4/2011 | | |
| FI | 2 073 446 A1 | 6/2009 | | |

OTHER PUBLICATIONS

[Online] "Dynamic Line Management for Digital Subscriber Lines", Internet Citation, Apr. 8, 2005, 9 pages.
Office Action dated Jun. 30, 2017 issued in Chinese Application No. 201580015515.1 (5 pgs) and translation (7 pgs.).
Search Report issued in Chinese Application No. 201580015515.1 (2 pgs.) and translation (2 pgs.).

* cited by examiner

DYNAMIC LINE MANAGEMENT

This application is the U.S. national phase of International Application No. PCT/GB2015/050756 filed 16 Mar. 2015 which designated the U.S. and claims priority to EP Patent Application No. 14250051.1 filed 24 Mar. 2014, the entire contents of each of which are hereby incorporated by reference.

FIELD OF THE INVENTION

This invention relates to a method of managing a digital subscriber line in a telecommunications network, in particular where dynamic line management profile adjustments are made in dependence on a quality of experience measure associated with the line.

BACKGROUND TO THE INVENTION

Digital subscriber line (DSL) technology, often referred to as "broadband", is a family of services that provides high speed digital data transmission over the metallic twisted copper pairs that form part of a local telephone network. DSL is commonly used to provide a customer's home with a network connection, typically to the Internet via an Internet Service Provider (ISP).

However, DSL lines are susceptible to interference, causing transmission errors and synchronisation problems. Synchronisation on a line can be lost when interference is so large that the data (signal) being transmitted cannot be properly processed. Line management techniques can help address this problem by trying to stabilise a line, usually at the expense of the line synchronisation rate. One such technique is known as Dynamic Line Management DLM.

DLM monitors line parameters (such as error rates and re-synchronisation events) associated with the DSL lines, and sets a line profile for each line accordingly. The line profile determines the line configuration parameters used on a line, which can include the setting of target signal to noise ratio margin, use of error correction techniques, and even capping the line synchronisation rate. All these impact on the rate at which the line will synchronise at. With DLM, use of line profiles provides a trade-off between line stability and synchronisation rate. For example, setting a line profile with a higher target signal to noise ratio margin may result in a more stable line that is more tolerant to the presence of noise on the line, but the resulting synchronisation rate will be reduced.

However, certain conditions can occur in the network where even DLM is unable to find a line profile that can stabilise the performance of the DSL line. Examples of these conditions include Repetitive Electrical Impulse Noise (REIN), and metallic faults on the line such as high resistance joints or unstable physical connections. REIN is particularly problematic as is it is often difficult to identify the source, though it can for example originate from faulty external power sources such as power supply units and lighting units. These conditions can be brief events lasting only seconds, or can be present for longer periods (minutes or even hours). During this time, even with DLM active, the DSL line may not be able to achieve synchronisation or can only do so at a very low synchronisation rate.

SUMMARY OF THE INVENTION

It is the aim of aspects of the present invention to provide an improved method of dynamic line management.

According to one aspect of the present invention, there is provided a method of managing a digital subscriber line in a network, comprising:
determining a quality of experience measure and line synchronisation rate associated with each of a plurality of line profiles applied to the digital subscriber line;
selecting a line profile from the plurality of line profiles applied to the digital subscriber line that has an associated quality of experience measure equivalent to or better than the quality of experience measure associated with the line profile currently applied to the digital subscriber line, and if there is more than one line profile with an equivalent to or better quality of experience measure, then selecting the line profile with the highest associated line synchronisation rate;
applying the selected line profile to the digital subscriber line.

The method may first apply a plurality of profiles to the digital subscriber line, until there are no further profiles left to apply. This may happen when DLM detects problems with the line, and tries unsuccessfully to stabilise the line by successively applying line profiles until there are no more profiles left to apply.

The quality of experience measure may be dependent on line parameters associated with the digital subscriber line, and where the line parameters are indicative of the performance on the line. Furthermore, the quality of experience measure may be time dependent. For example, a consumer user who generally only uses the line in the evenings between 6 μm and 12 am, might have a quality of experience measure weighted according during these periods.

The method may further comprise prior to the selecting step, determining if the quality of experience measure for the current profile is in improvement on previously applied profiles.

According to a further aspect of the invention, there is provided a line management module for managing a digital subscriber line, adapted to:
determine a quality of experience measure and line synchronisation rate associated with each of a plurality of line profiles applied to the digital subscriber line;
select a line profile from the plurality of line profiles applied to the digital subscriber line that has an associated quality of experience measure equivalent to or better than the quality of experience measure associated with the line profile currently applied to the digital subscriber line, and if there is more than one line profile with an equivalent to or better quality of experience measure, then selecting the line profile with the highest associated line synchronisation rate;
apply the selected line profile to the digital subscriber line.

In examples of the invention, for every step in a DLM process to improve a DSL line performance, a Quality of Experience (QoE) measure is determined. Once the DLM process has gone as far as possible to stabilise a line, then if the QoE metric has not significantly improved, then the line is returned to a previously applied profile that gives the best DSL performance (in particular with regard to synchronisation rate) for an equivalent or better QoE. Then, only if that QoE measure degrades or improves does the system revert back to standard DLM to try and find a more suitable profile.

What has been observed in some real lines impacted by certain types of external noise or metallic fault conditions, is that during certain periods of the day the degradation in DSL performance is beyond that which can be stabilised by normal DLM systems. At other times when the condition is not present, the line can run very well. However, existing DLM systems will progressively apply profiles that will drive down the performance of the line (usually to a very low synchronisation rate), where it remains until the condition is resolved. For certain types of noise, the condition is never resolved, so the experience for the end user remains poor at all times. The present invention aims to give the user the best experience possible (generally in terms of synchronisation rate), when DLM alone is unable to improve things.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

This invention relates to a method of dynamic line management (DLM) for a digital subscriber line. A quality of experience (QoE) measure is calculated for the digital subscriber line, and the QoE is recorded with the respective DLM line profile and also the line synchronisation rate associated with the line profile. The QoE measure is preferably based on line parameters such as a count of the error rate on the line and loss of synchronisations on the line, averaged over a predetermined period of time. Other line parameters could be used in determining the QoE measure. When DLM exhausts all the available line profiles, the invention checks to see if the QoE associated with the line profile currently being applied is an improvement on the QoE of previously applied line profiles, and if it is an improvement, then the current line profile is maintained. However, if the new QoE is not an improvement to that associated with a previously applied line profile, then the invention reverts the line back to one of the earlier line profiles. The line profile selected to revert back to is one having the same QoE or better, and if there are multiple line profiles satisfying that condition, then the line profile that has the highest associated line synchronisation rate is selected.

Figure 1:
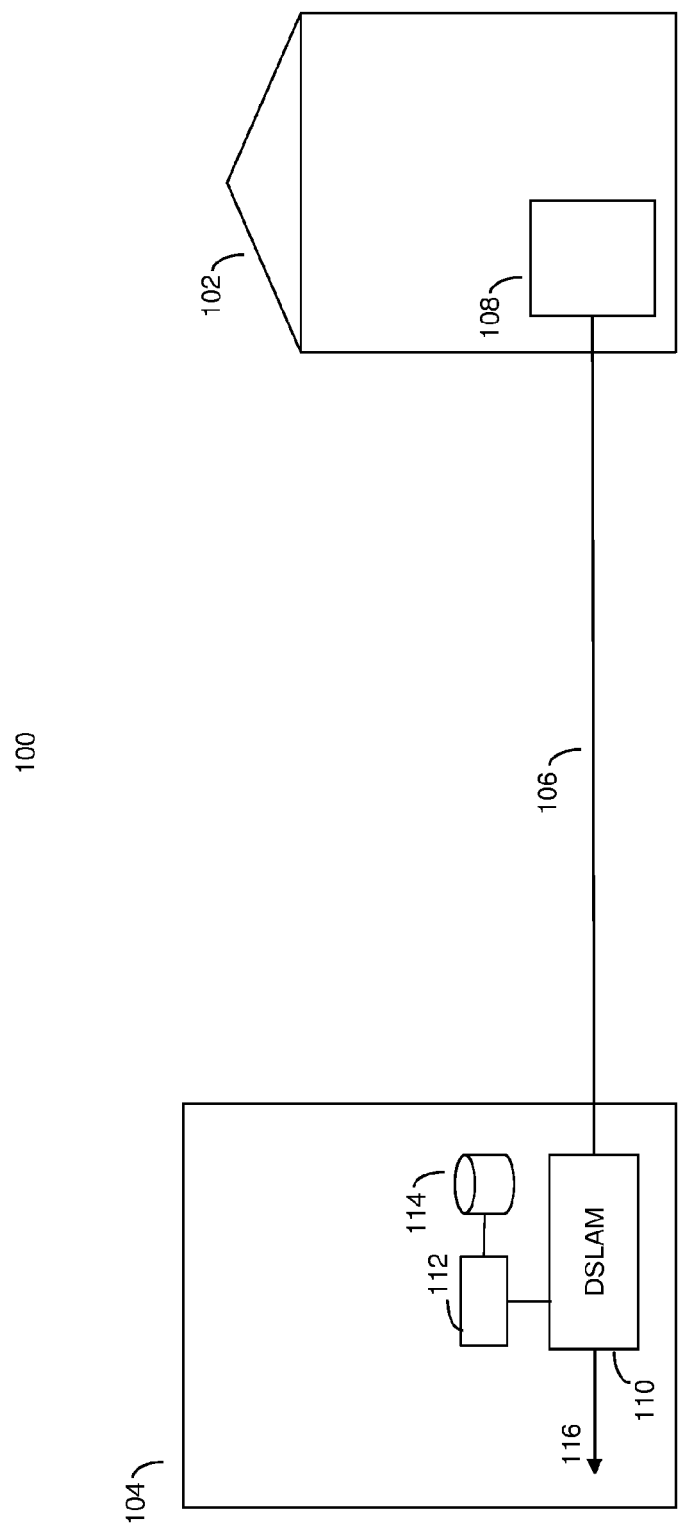
FIG. 1 is a system diagram showing a telephone exchange and a DSL line running to a customer premises.

FIG. 1 illustrates a telecommunications network 100 including a customer's premises 102. The customer's premises 102 is connected to a telephone exchange 104 via a telephone line 106. The telephone line 106 is a twisted copper or aluminium pair of wires. Within the customer premises 102, there is a customer premises equipment CPE 108, such as a modem or home hub, to which the line 106 is connected. At the exchange 104, the line 106 is connected to a digital subscriber line access multiplexer, DSLAM, 110.

The DSLAM 110 is a network element that provides digital subscriber line (DSL) services to connected lines and associated customer premises. The line 106 is thus also referred to as digital subscriber line, or DSL line. Connected to the DSLAM 110 is a rate adaptive management module 112, which provides dynamic line management DLM for lines connected to the DSLAM 110. The rate adaptive management module 112 monitors the performance of connected lines, and uses DLM to determine the stability of a line and apply an appropriate line profile to the line. The line profile defines operational parameters for the line, such as the target signal to noise ratio margin, error correction technique to be used, and whether the line synchronisation rate should be capped. These operational parameters are used by the DSLAM 110 when a line is initialised and synchronised. The choice of line profile made by the rate adaptive management module 112 is based on line performance parameters measured at the DSLAM 110 and CPE 108.

The rate adaptive management module 112 has access to a data store 114, which can be a hard disk array, solid state storage or similar. The data store 114 is used to store line parameters and other data associated with the line 106, and can be used to store measurements reported by the DSLAM 110.

Whilst the rate adaptive management module 112 is described here as being connected to and located near the DLSAM 110, the module 112 can be located remotely in a separate location, and further can be connected indirectly via a management interface.

The operation of the rate adaptive management module 112 according to aspects of the invention will be described in more detail below.

The DSLAM 110 also has onward connections 116 to data provisioning networks. A skilled person will also appreciate that there are other elements in the exchange 104, such as elements that provide standard PSTN services to connected lines. However, these have been omitted for simplicity.

Whilst the present example shows a DSLAM 110 residing in the exchange 104, the invention would still be applicable to configurations where the DSLAM is located elsewhere. For example, in a fibre to the cabinet (FTTC) arrangement, the DSLAM 110 would be located in a roadside cabinet, which is typically located nearer the customer premises than the exchange. Thus, in a general arrangement of fibre to the distribution point or fibre to the remote node, any other point in the network where the network electronics are located would also be applicable for the location of the DSLAM.

In an alternative network arrangement, DSLAM like functionality can be provided by an MSAN (multi services access node), which also provides other capabilities such as voice.

The DSL line 106 will experience varying degrees of interference during its operation. As described above, the rate adaptive management module 112 will try and stabilise the line 106 by applying DLM and different line profiles as necessary.

Figure 2:
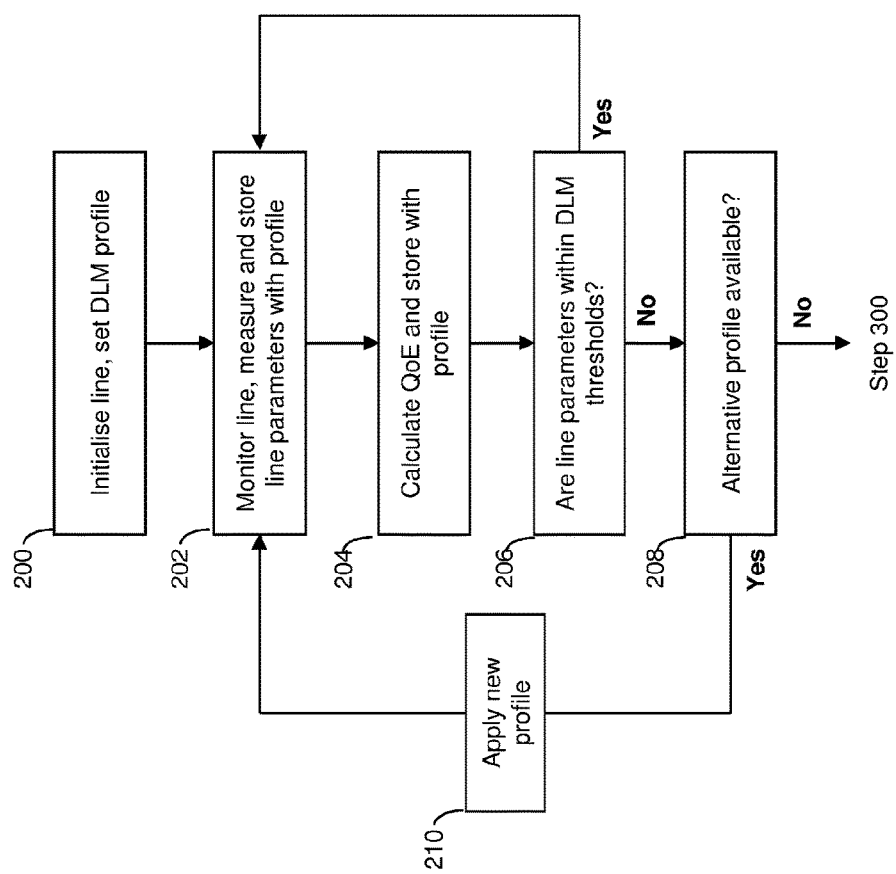
FIG. 2 is a flow chart summarising the preliminary steps of an example of the present invention.

An example of the present invention will now be described with reference to the flow chart of FIG. 2. The steps of FIG. 2 are performed by the rate adaptive management module 112 unless otherwise stated.

Processing starts at step 200, when the line 106 is initialised, and a line profile selected by the rate adaptive management module 112 and applied by the DSLAM 110. During the initialisation process, the DSLAM and the modem in the CPE 108 perform channel analysis on the line 106, and communicate with each other to achieve synchronisation of the line 106. The line profile applied when the line is initialised is usually a predetermined one. In this example, the line profile may start with a fully rate adaptive profile that allows the DSLAM 110 and CPE 108 to synchronise at the best line rate possible for the current line conditions. This rate may be less than the absolute maximum allowed by the line profile. After successful synchronisation the initial synchronisation rate for the line will be established and the line 106 is ready to carry data. The line profile applied and the corresponding line synchronisation rate are stored in the data store 114.

In step 202, the performance of the line 106 is monitored. This is done by the DSLAM 110, with various line parameters being measured and stored in the data store 114. These line parameters are indicative of the performance of the line, and include for example the number of initialisations, errored seconds, mean time between errors (MTBE), uncorrected errors, code violations, noise margin, and line rate. Note, the MTBE is the mean time between errored seconds, in contrast to the uncorrected errors which is a count of all the errors that could not be corrected. As such, the data store 114 will have stored for the line 106, an indication of the line profile applied at any given time, as well a history of the line parameters measured for that line 106. The line parameters are measured every 15 minutes, but any interval can be used.

In step 204, rate adaptive management module 112 calculates a quality of experience (QoE) measure for the line 106. The QoE measure is preferably calculated using line parameters taken from the DSLAM 110/data store 114. Below is an example of how the QoE measure can be calculated.

The QoE measure can be made up of individual QoE measures, one for each of a number of line parameters, which can then be combined. These line parameters are selectable by the network operator depending on importance to the operator and/or end user. In this example, the number of errored seconds and the number of line initialisations for a given time period are used, both of which are indicative of the performance of the line. The importance could also be related to time of use of the line, for example a business user may only be interested in performance during working hours (say 8 am to 6 pm), Monday to Friday. Time of usage could also be determined by looking at the traffic statistics for the line. The time of usage statistics can then be used to weight the value of the individual time period QoE values. Preferably, the weight (time_weighting$_n$) should be a multiplier in the range 0 to 1, with the default=1, and reflects the importance of a given time of day. So, for a business line, the time_weighting can be set to 1 between 8 am and 6 pm, but outside of these hours, the weighting can be set closer to 0. Similarly, for a typical consumer user, who generally only uses the line in the evenings between 6 pm and 12 am, then the weighting can be set to 1 for that period, but perhaps closer to 0 outside that period.

Initially, a QoE measure for each parameter being monitored is calculated for each time window n (for example every 60 minutes, but could equally be more or less granular). Equation (1) below shows the individual QoE measure, QoE_error$_n$, associated with the number of errored seconds parameter for time period n:

$$QoE\_error_n = \left(\frac{\text{errored seconds for time } period_n}{\text{time period}}\right) \cdot \text{time\_weighting}_n \quad (1)$$

where time period is the duration of the time period n, and time_weighting$_n$ is the weighting as described above associated with time period n.

Equation (2) below shows the individual QoE measure, QoE_init$_n$, associated with the number of line initialisations parameter for time period n:

$$QoE\_init_n = \left(\frac{\text{inits for time } period_n}{\text{time period}}\right) \cdot \text{time\_weighting}_n \quad (2)$$

where time period is the duration of the time period n, and time_weighting$_n$ is the weighting as described above associated with time period n.

Additional or alternative individual QoE measures could be used.

A daily QoE measure is then created by summation of the individual QoE measures. This can be calculated part way through the day, and does not have to be for a full day. Since day of the week may also be important then a day of week weighting (being a multiplier in the range 0 to 1, default=1) can also be applied QoE calculation for that day. Again the day weighting can be based on usage stats, or known usage pattern i.e. weekdays only. Equation (3) below shows the daily QoE measure, QoE$_{day}$, with a day weighting applied:

$$QoE_{day} = (\Sigma_{n=1}^{n\_total} QoE\_error_n + QoE\_init_n) \cdot \text{day\_weighting} \quad (3)$$

For each new day, there will be a new QoE$_{day}$ measure. Since a profile may be applied for an indeterminate length of time, it is preferable to average all the QoE$_{day}$ measures over the duration that the associated line profile is being applied. The resulting QoE measure for the profile, QoE (profile) is one based on continuously averaging all the daily QoE measures associated with the line profile being applied.

As an alternative, the QoE(profile) can take into consideration only a limited number of days measurements, such as the last 28 days or over only the last 7 days.

It should be noted that the time_weighting and day_weighting described above are optional and can be omitted, which can be effectively done by always setting to the value to 1.

The calculated QoE is stored in the data store 114 with the current line profile in step 204.

In step 206, the rate adaptive management module 112 checks to see if the line parameters measured in step 202 are within the predetermined thresholds set by DLM. This is effectively a check on the stability of the line. Typically when DLM needs to take action to stabilise a line's performance, the profile of the line will be managed downwards until the line either stabilises or DLM runs out of profiles to apply. The most common parameters checked are of the errored seconds or MTBE and initialisations line parameters for a period of time. The specific threshold limits set are variable and can be adjusted by the network operator. Typically, the line parameter check as a result of DLM is performed on a daily basis.

If the parameters are within the thresholds, then the line 106 is considered to be stable, and processing reverts back to step 202, with the line being continuously monitored and parameters measured and recorded.

However, if the parameters are not within the thresholds, then the line 106 is considered to be unstable. Processing passes then instead to step 208, where a check is made by the rate adaptive management module 112 to determine whether there is an alternative profile available. If a new profile is available, then the new profile is applied in step 210 by the DSLAM, and the line 106 resynchronised to apply the new profile. Processing then passes back to step 202, where the line 106 is monitored and line parameters stored with the new profile details. A new QoE associated with the new profile is also calculated and stored, and the process repeats, with the line being continuously checked, and profile adjusted as necessary to try and stabilise the line 106.

However, if in step 208, there are no further profiles available, then DLM has effectively done all it can to try and stabilise the line by adjusting the line profile. When this happens, processing passes to step 300 in FIG. 3.

As a result of steps 202 to 208, and the repeated application of new profiles by DLM, the data store 114 will have stored details of the profiles that have previously and currently applied, as well as the associated QoE (and any line parameter measurements). The table below illustrates the data stored, which includes the line synchronisation rate as described in step 202. However, the line parameter measurements have been omitted for clarity.

TABLE 1

| Profile | QoE | Synch rate |
| --- | --- | --- |
| profile 1 | QoE(profile 1) | rate(profile 1) |
| profile 2 | QoE(profile 2) | rate(profile 2) |
| ... | ... | ... |
| profile m | QoE(profile m) | rate(profile m) |

Figure 3:
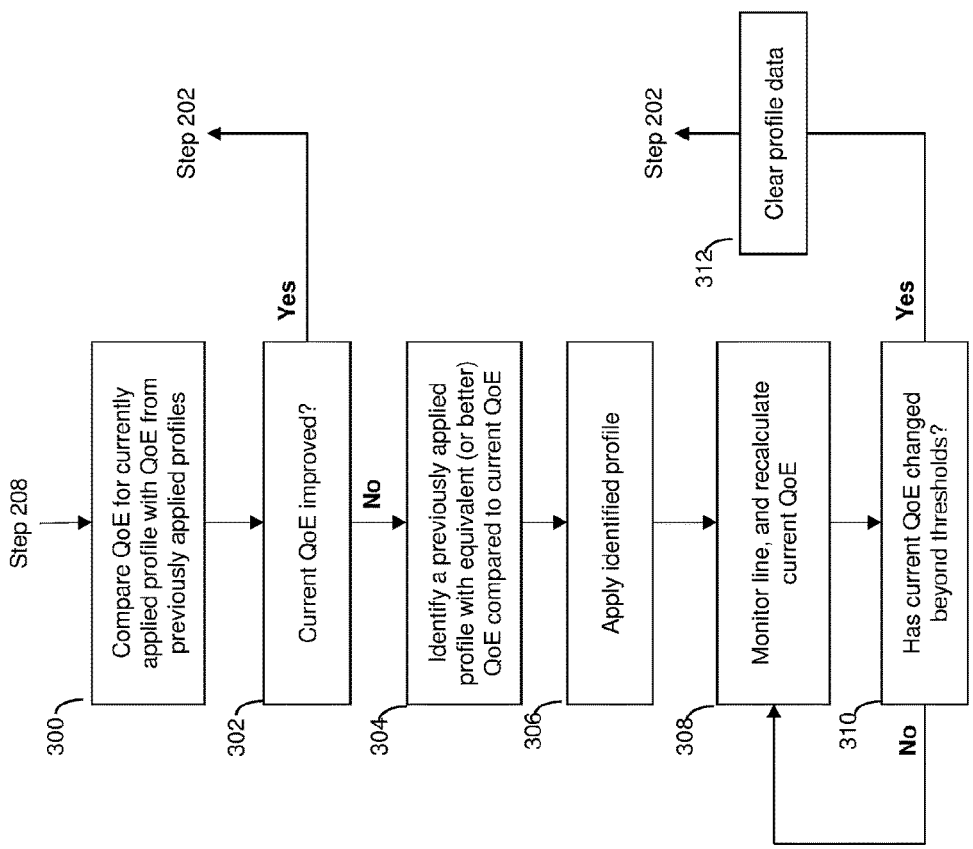
FIG. 3 is a flow chart summarising the main steps of an example of the present invention.

FIG. 3 illustrates the steps of the invention where the current QoE is assessed and if no improvement has been made by DLM an attempt is made to return the line 106 to a previously applied profile that gives the best performance for an equivalent QoE. Processing starts at step 300, where the QoE of the profile that is currently being applied to the line 106 is compared by the rate adaptive management module 112 to the QoE associated with previously applied profiles, using the historical profile data stored in the data store 114.

In step 302, a test is performed to determine if the current QoE is less than the QoE from any previously applied profiles. This equates to an improved quality of experience to the end user. Based on the calculation of QoE above, a low QoE is preferred over a high QoE, and thus the test would be, for each of the previous profiles, whether QoE(current profile)<QoE(previous profile)−T, where T is an acceptable tolerance. If QoE(current profile) is lower, then processing passes back to step 202. However, if the QoE(current profile) is greater than or equal to the previous QoE values, then processing passes to step 304, and the invention will attempt to identify and apply an earlier line profile with a similar QoE measure.

In step 304, a previously applied profile is identified from the profiles stored (as listed in Table 1) that has an associated QoE that is equivalent or better. Thus, the check described above to see if QoE(current)<QoE(previous profile) is performed. If there are several previously applied profiles with an equivalent or better QoE, then the profile with the highest associated synchronisation rate is selected.

In step 306, the identified previous profile is applied to the line 106 by re-synchronising the line 106 at the DSLAM 110.

After the line 106 is re-synchronised, the line 106 does not drop back into the DLM process of FIG. 2. Instead the line 106 is continuously monitored starting at step 308, and the individual QOE measures calculated every 60 minutes, and the current QoE for the profile calculated daily, as above. Initially, there will only be a single QoE measure, the initial QoE, as calculated after the previous profile has been applied in step 306, but over time there will be updated current QoE measures (every day in this example). In step 310, a check is made to see if the latest current QoE has changed beyond a predetermined threshold relative to the initial QoE measure for the present profile. If not, then processing cycles back to step 308, with the line being continuously monitored, and current QoE recalculated. However, if the current QoE changes beyond the thresholds, so either a significant improvement or degradation in the performance of the line, then processing reverts back to step 202, and standard DLM is applied, after the profile data as illustrated in Table 1 is cleared first in step 312.

The thresholds used in step 310 can be adjusted by the network operator, with the aim to account for small variances in the calculated QoE measure that should effectively be the same, and avoid jumping in and out of the process as a result of minor operational fluctuations.

The aim of this final loop of steps 308 and 310 are to keep the line 106 on the new profile whilst the current QoE does not significantly change, but once the current QoE changes significantly, then to handover processing back to standard DLM starting at step 202. The data stored in relation to profiles, as illustrated in Table 1, is cleared in step 312 upon returning to standard DLM in step 202, so as only data in relation to those profiles in the new/latest DLM cycle are used.

Exemplary embodiments of the invention are realised, at least in part, by executable computer program code which may be embodied in an application program data. When such computer program code is loaded into the memory of the processor in the rate adaptation management module 112, it provides a computer program code structure which is capable of performing at least part of the methods in accordance with the above described exemplary embodiments of the invention.

A person skilled in the art will appreciate that the computer program structure referred can correspond to the flow charts shown in FIG. 2 and FIG. 3, where each step of the flow charts can correspond to at least one line of computer program code and that such, in combination with the processor in the rate adaptation management module 112, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing a digital subscriber line in a network, comprising:
   a) determining a quality of experience measure and line synchronization rate associated with each of a plurality of line profiles applied to the digital subscriber line;
   b) selecting a line profile from the plurality of line profiles applied to the digital subscriber line that has an associated quality of experience measure equivalent to or better than the quality of experience measure associated with the line profile currently applied to the digital subscriber line, and if there is more than one line profile with an equivalent to or better quality of experience measure, then selecting the line profile with the highest associated line synchronization rate;
   c) applying the selected line profile to the digital subscriber line.

2. A method according to claim 1, further comprising applying plurality of profiles to the digital subscriber line until there are no further profiles to apply.

3. A method according to claim 1, wherein the quality of experience measure is dependent on line parameters associated with the digital subscriber line, and where the line parameters are indicative of the performance on the line.

4. A method according to claim 1, wherein the quality of experience measure is time dependent.

5. A method according to claim 1, wherein the method further comprises prior to the selecting step, determining if the quality of experience measure for the current profile is an improvement on previously applied profiles.

6. A non-transitory computer-readable storage medium storing instructions of a line management module, which upon execution by a computer performs management of a digital subscriber line such that the computer is at least configured to:
   a) determine a quality of experience measure and line synchronization rate associated with each of a plurality of line profiles applied to the digital subscriber line;
   b) select a line profile from the plurality of line profiles applied to the digital subscriber line that has an associated quality of experience measure equivalent to or better than the quality of experience measure associated with the line profile currently applied to the digital subscriber line, and if there is more than one line profile with an equivalent to or better quality of experience measure, then selecting the line profile with the highest associated line synchronization rate;
   c) apply the selected line profile to the digital subscriber line.

7. A method of managing a digital subscriber line in a network, the method comprising:
   calculating a quality of experience measure for the digital subscriber line;
   storing the quality of experience measure in a line profile along with a line synchronization rate associated with the line profile; and
   checking whether or not the quality of experience measure associated with the line profile currently being applied is an improvement on the quality of experience measure of previously applied line profiles, and
      if the checking indicates that there is an improvement, maintaining the line profile currently being applied to the digital subscriber line; and
      if the checking indicates that there is not an improvement, reverting the line back to one of the previously applied line profiles, the reverting including:
         determining if there are multiple line profiles that satisfy a condition of having a same or better quality of experience measure than the line profile currently being applied; and
         if the determination is made that there are multiple line profiles that satisfy the condition, selecting the line profile that has the highest associated line synchronization rate as the one of the previously applied line profiles to revert back to.

8. The method according to claim 7, wherein the quality of experience measure is calculated based on line parameters including a count of an error rate on the line and a loss of synchronizations on the line.

9. The method according to claim 7, wherein the quality of experience measure is calculated based on line parameters including a count of an error rate on the line and a loss of synchronizations on the line, averaged over a predetermined period of time.

* * * * *